United States Patent [19]

Nishikawa et al.

[11] Patent Number: 4,944,821

[45] Date of Patent: Jul. 31, 1990

[54] ADHESIVE TREATMENT FOR NYLON CORDS

[75] Inventors: Tomohisa Nishikawa, Kodaira; Kazuo Oshima, Higashiyamato, both of Japan

[73] Assignee: Bridgestone Corporation, Tokyo, Japan

[21] Appl. No.: 284,530

[22] Filed: Dec. 15, 1988

[30] Foreign Application Priority Data

Dec. 28, 1987 [JP] Japan .................................. 62-330286
Dec. 28, 1987 [JP] Japan .................................. 62-330287

[51] Int. Cl.$^5$ ........................... B05D 1/18; B05D 5/10
[52] U.S. Cl. ............................................ 156/161; 57/7;
57/297; 57/310; 156/148; 156/166; 156/327;
156/331.6; 156/335; 264/129; 264/103;
264/137; 264/290.5; 427/175; 427/434.6
[58] Field of Search .............. 156/161, 335, 166, 148,
156/331.6, 327; 264/137, 103, 290.5, 129; 57/7,
297, 310; 427/175, 434.6

[56] References Cited

U.S. PATENT DOCUMENTS

| 3,793,425 | 2/1974 | Arrowsmith | 264/137 |
| 3,888,805 | 6/1975 | Van Gils et al. | 156/161 |

FOREIGN PATENT DOCUMENTS

| 59-26517 | 2/1984 | Japan . |
| 60-71238 | 4/1985 | Japan . |
| 60-71239 | 4/1985 | Japan . |
| 60-71240 | 4/1985 | Japan . |
| 61-70008 | 4/1986 | Japan . |

*Primary Examiner*—Hubert C. Lorin
*Attorney, Agent, or Firm*—Sughrue, Mion, Zinn, Macpeak & Seas

[57] ABSTRACT

Nylon cords having a yarn strength of not less than 12 g/d are subjected to a stretch heating treatment under specified conditions before the dipping and then dipped in a dipping solution having a particular composition, whereby the strength and adhesion force of the resulting dipped cords are considerably improved for use in large size tires.

8 Claims, 9 Drawing Sheets

FIG_1

FIG_2

Subscript Numeral: Adhesion Force (kg/cord)
Oblique Region: Adhesion Force of not Less than 1.6 kg/cord

FIG_4

FIG_5

FIG_6

Subscript Numeral: Adhesion Force (kg/cord)
Oblique Region: Adhesion Force of not Less than 1.6 kg/cord

FIG_8

FIG. 10 PRIOR ART

ADHESIVE TREATMENT FOR NYLON CORDS

BACKGROUND OF THE INVENTION

1. Field of the Invention

This invention relates to a method of treating a so-called super-high strength nylon cord having a yarn strength of not less than 12 g/d with an adhesive.

2. Related Art Statement

Nylon fibers have excellent strength, durability and heat resistance among cord materials for tire reinforcement, so that they are frequently applied to large size tires for truck, bus, construction vehicle, airplane and the like.

On the other hand, it is strongly demanded to reduce the laminating number of reinforcing materials in the tire as well as the end count of cords in the reinforcing material from viewpoints of cost down, low fuel consumption owing to reduction of tire weight, resource-saving and the like.

For such demands, nylon fibers having a molecular weight equal to that of the conventional nylon and considerably increasing the strength have recently been developed (for example, Japanese Patent laid open No. 59-26517 and No. 61-70008), from which there is a possibility of developing a strength of not less than 12 g/d. However, the inventors have confirmed that such a nylon having higher strength (hereinafter referred to as a super-high strength nylon) has a drawback that the strength is largely lowered after the adhesive treatment (hereinafter referred to as dipping) and the strength of the resulting dipped cord is approximately equal to that of the conventional nylon.

Moreover, the some reduction of strength is caused even in the dipping of the high strength nylon having a yarn strength of about 10.5 g/d. In this connection, various dipping systems are proposed as a countermeasure for preventing the strength reduction of such a dipped cord (Japanese Patent laid open No. 60-71238, No. 60-71239 and No. 60-71240). However, all of these countermeasures are applied to only the high strength nylon having a yarn strength of about 10.5 g/d. Up to the present, there is not yet developed a method of preventing the reduction of strength in the super-high strength nylon aimed at the invention.

Under the above circumstances, the inventors have made various studies in order to develop a method for the prevention of strength reduction in the super-high strength nylon and found that the reduction of strength in the dipped cord made from the super-high strength nylon having a yarn strength of not less than 12 g/d can be prevented by rendering a tension of the cord into not less than 0.5 g/d in the dipping solution or by preliminarily treating the cord at a temperature of not lower than 100° C. when the tire reinforcing cords made from super-high strength nylon-6 or nylon-6,6 fibers having a yarn strength of not less than 12 g/d are subjected to a dipping treatment with a mixed solution of resorcin-formaldehyde condensate and rubber latex (Japanese Patent Application No. 62-32526).

According to such a dipping method, the reduction of strength in the dipped cord is certainly prevented, but the adhesion force is fairly low. As a result, when such a dipped cord is used as a tire reinforcing cord, there is a serious problem that the adhesion force between rubber and cord is considerably poor.

SUMMARY OF THE INVENTION

It is, therefore, an object of the invention to provide an adhesive treatment method which can prevent the reduction of strength in the dipped cord of the super-high strength nylon-6 or nylon-6,6 having a strength of not less than 12 g/d and also prevent the decrease of adhesion force between rubber and cord to obtain super-high strength nylon-6 or nylon-6,6 cords sufficiently durable to practical use.

The inventors have made further studies in order to solve the aforementioned problems and found that when twisted cords made from super-high strength nylon-6 or nylon-6,6 fibers are subjected to an adhesive treatment, the twisted cord is first subjected to a stretch heating treatment under given temperature and tension conditions and then treated with a given dipping solution, whereby the reduction of strength (reduction ratio of about 25%) after the dipping treatment can be prevented and also the cord adhesion force durable to use as a tire cord can be given, and as a result, the invention has been accomplished.

According to a first aspect of the invention, there is the provision of a method of treating nylon-6 cord with an adhesive, characterized in that a twisted cord made from nylon-6 fiber having a yarn strength of not less than 12 g/d is subjected to a stretch heating treatment under temperature and tension conditions satisfying the following relation:

$$T \geq 84/S - 80 \quad (1)$$

(T is a temperature (°C.) in the stretch heating treatment of the cord and S is a tension (g/d) in the stretch heating treatment of the cord), and then subjected to an adhesive treatment in a dipping solution satisfying the following relations:

$$y \geq -0.75x + b \quad (2)$$

$$b = -0.274z^2 + 4.282z + 16.8 \quad (3)$$

(x is a solid content (weight %) in the dipping solution, y is a ratio (weight %) of total weight of resorcin and formaldehyde to weight of latex in the dipping solution and z is a ratio (weight %) of weight of vinylpyridine latex to total weight of vinylpyridine latex and styrene-butadiene copolymer latex in the latex of the dipping solution).

According to a second aspect of the invention, there is the provision of a method of treating nylon-6,6 cord with an adhesive, characterized in that a twisted cord made from nylon-6,6 fiber having a yarn strength of not less than 12 g/d is subjected to a stretch heating treatment under temperature and tension conditions satisfying the following relation:

$$T \geq 87/S - 49 \quad (4)$$

(T is a temperature (°C.) in the stretch heating treatment of the cord and S is a tension (g/d) in the stretch heating treatment of the cord), and then subjected to an adhesive treatment in a dipping solution satisfying the following relations:

$$y \geq -0.61x + b \quad (5)$$

$$b = -0.1319z^2 + 1.566z + 25.87 \quad (6)$$

(x is a solid content (weight %) in the dipping solution, y is a ratio (weight %) of total weight of resorcin and formaldehyde to weight of latex in the dipping solution and z is a ratio (weight %) of weight of vinylpyridine latex to total weight of vinylpyridine latex and styrene-butadiene copolymer latex in the latex of the dipping solution).

According to the invention, nylon-6 fiber is a fiber consisting mainly of a polymer produced by polymerization of ε-caprolactam and having the following structural formula:

Further, nylon-6,6 fiber is a fiber consisting mainly of a polymer (dibasic type nylon) produced by polycondensation of adipic acid and hexamethylenediamine and having the following structure formula:

BRIEF DESCRIPTION OF THE DRAWINGS

The invention will be described with reference to the accompanying drawings, wherein.

DESCRIPTION OF THE PREFERRED EMBODIMENTS

The invention will be described in detail with respect to the aforementioned relations (1) and (4) in the stretch heating treatment.

In general, the dipping step of the nylon cord is the drying and resinification of an adhesive through drying and stretch heating treatment steps after the adhesive is applied to or impregnated into the untreated cord. The inventors have found that the adhesive penetrates into the inside of the cord made from the super-high strength nylon or nylon filament yarns and is resinified to cause adhesion between mutual filaments at the dipping step after the drying and stretch heating treatment steps and consequently the movement of the filaments constituting the cord is restrained and stress is not uniformly dispersed to all filaments in the cord to thereby reduce the strength of the dipped cord. That is, it has been ascertained that it is very important to prevent the penetration of the adhesive into the inside of the cord for preventing the reduction of cord strength after the dipping.

Now, the inventors have made further examinations in order to establish the dipping method capable of preventing such a strength reduction on the basis of the clarification of the mechanism for causing the strength reduction in the super-high strength nylon cord having a yarn strength of not less than 12 g/d after the dipping, and found that when the super-high strength nylon cord is subjected to a stretch heating treatment or a heat rolling treatment prior to the dipping, the filaments constituting the cord become closed to a close-packed state by heat, tension or pressure and the dipping solution hardly penetrates into the inside of the cord, whereby the strength reduction of the super-high strength nylon cord after the dipping can largely be improved.

Figure 1:
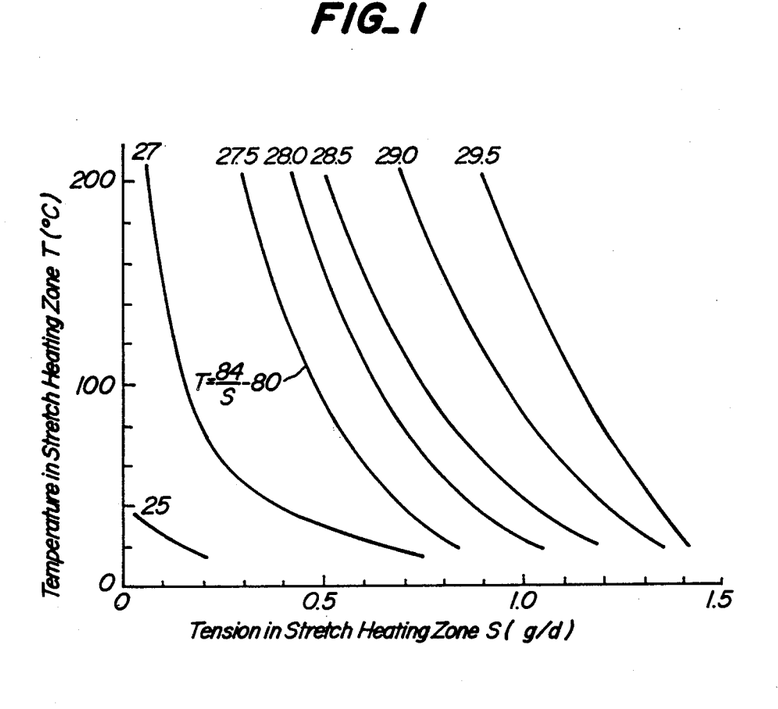
FIG. 1 is a graph showing a relation between tension S and temperature T in the stretch heating zone and a relation of strength of the dipped cord thereto.
Figure 4:
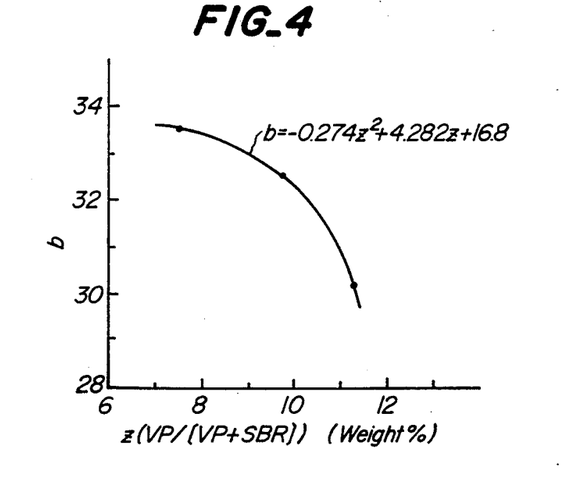
FIG. 4 is a graph showing a relation between z [VP/(SBR+VP)] and b.
Figure 5:
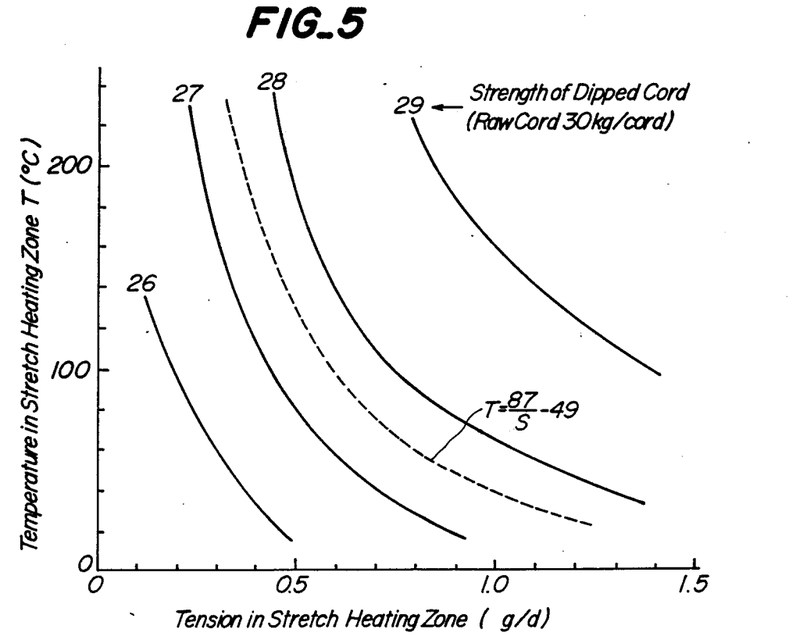
FIG. 5 is a graph showing a relation between tension S and temperature T in the stretch heating zone and a relation of strength of the dipped cord thereto.

In the stretch heating treatment or heat rolling treatment prior to the immersion into the dipping solution, the strength of the dipped cord is shown in FIG. 1 or 4 under a relation between temperature and tension in the stretch heating treatment, wherein FIG. 1 is a case of using super-high strength nylon-6 cord and FIG. 4 is a case of using super-high strength nylon-6,6 cord. In this case, the strength of raw cord is 30 kg/cord and the yarn strength is 13.5 g/d. FIGS. 1 and 4 show strengths of dipped cords made from nylon-6 and nylon-6,6, respectively, as measured under various stretch heating treatment conditions. From FIGS. 1 and 4, it has been ascertained that when the temperature T (°C.) and the tension S (g/d) in the stretch heating treatment of the cord before the application or impregnation of the dipping solution satisfy the relation (1) or (4), the strength of the dipped cord can be held so as to exceed 90% as compared with that of the raw cord.

Further, as seen from FIGS. 1 and 4, the strength reduction of the dipped cord becomes small as the temperature in the stretch heating treatment of the cord before the application or impregnation of the dipping solution becomes higher or the tension thereof becomes higher and consequently the dipped cords having higher strength can be obtained. That is, as the temperature and tension in the stretch heating treatment of the cord before the application or impregnation of the dipping solution become high, the dipped cords having a higher strength are obtained.

In case of the super-high strength nylon-6 cord, when the stretch heating temperature is higher than 225° C., it is higher than the melting point of nylon-6 and the cord is fused, so that the stretch heating temperature is preferable to be not higher than 225° C., particularly not higher than 210° C. from a viewpoint of stable production. On the other hand, in case of the super-high strength nylon-6,6 cord, when the stretch heating temperature is higher than 260° C., it is higher than the melting point of nylon-6,6 and the cord is fused, so that the stretch heating temperature is preferable to be not higher than 255° C., particularly not higher than 230° C. from a viewpoint of stable production. Further, in case of the super-high strength nylon-6 and nylon-6,6 cords, it is preferable to make the tension higher, but when the tension exceeds 1.5 g/d, the strength of the dipped cord substantially approaches to that of the raw cord, so that the tension is favorable to be not more than 1.5 g/d from a viewpoint of the prevention of cord break-up.

Moreover, the time for the stretch heating treatment is preferable to be within a range of 10 to 60 seconds from viewpoints of the treating effect and productivity.

It is preferable that the cord after the stretch heating treatment or heat rolling treatment is continuously impregnated or coated with the dipping solution without coiling. In this case, the impregnation or application of the dipping solution is favorable to be carried out under a tension of not less than 0.5 g/d. Because, when the cord after the stretch heating treatment or heat rolling treatment is subjected to the dipping treatment under a given tension without coiling, the filaments constituting the cord come into contact with each other and the dipping solution hardly penetrates into the inside of the cord, but if the impregnation or application of the dipping solution is carried out after the coiling, a space is always formed in the inside of the cord and the dipping solution is apt to penetrate into the space.

Figure 2:
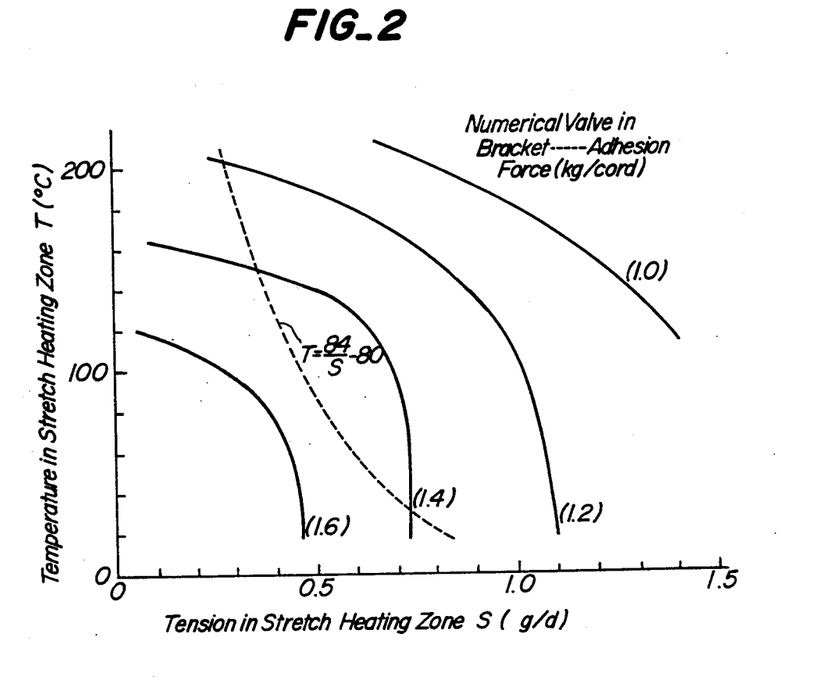
FIG. 2 is a graph showing a relation between tension S and temperature T in the strength heating zone and a relation of cord adhesion force thereto.
Figure 6:
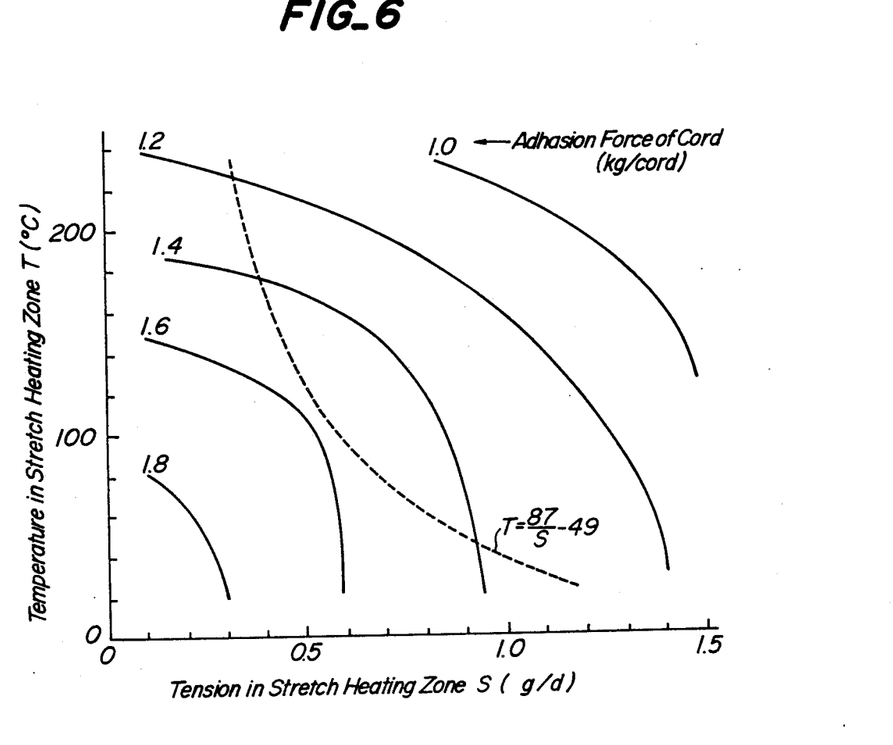
FIG. 6 is a graph showing a relation between tension S and temperature T in the stretch heating zone and a relation of cord adhesion force thereto.

As mentioned above, the stretch heating treatment of the cord before the application or impregnation of the dipping solution is very effective for preventing the strength reduction of the dipped cord, but there is still a serious problem that the adhesion force between rubber and cord largely lowers. That is, when the cords merely satisfying the relation (1) or (4) are used as a tire cord as they are, there is a large problem in the safety of the tire, so that the inventors have confirmed that it is necessary to improve the adhesion force between rubber and cord. This can easily be understood from FIGS. 2 and 6 showing a contour of adhesion force of cord after the stretch heating treatment and the dipping treatment, wherein an abscissa is a tension S in the stretch heating treatment and an ordinate is a temperature T in the stretch heating treatment. In FIGS. 2 and 6, the adhesion force decreases as the stretch heating temperature and tension increase. That is, if it is intended to prevent the strength reduction after the dipping treatment by carrying out the stretch heating treatment or heat rolling treatment before the application or impregnation of the adhesive (dipping solution), the large decrease of adhesion force inversely occurs. In this connection, the inventors have found that the adhesion amount of the adhesive to the dipped cord subjected to the stretch heating treatment or heat rolling treatment (amount of adhesive adhered per unit weight of cord) decrease, but there is a proportional relation between adhesion force of the dipped cord and adhesion amount of the adhesive though some scattering is generated between the adhesion force and the adhesion amount. In other words, it is considered that as the adhesion amount of the adhesive to the cord become large, the adhesion force becomes high and also the penetrability of the dipping solution into the inside of the cord contributes to the adhesion force.

Therefore, the inventors have made various examinations with respect to various dipping means, composition of the dipping solution, the dipping conditions and the like in order to ensure the adhesion level causing no problem in the tire safety, and confirmed that the improvement in the composition of the dipping solution is most effective for the improvement of the adhesion force and also the adhesion force can largely be improved by selecting the composition of the dipping solution so as to satisfy the relations (2) and (3) or (5) and (6). That is, the relations (2) and (3) or (5) and (6) are experimental formulae obtained as a result of the inventors' examinations on the composition of the dipping solution, which will be described in detail below.

Figure 3A:
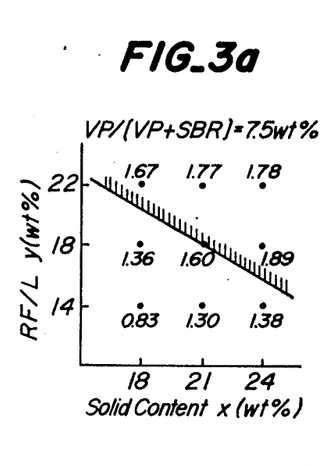
FIGS. 3a to 3c are graphs showing a relation between the composition of the dipping solution and adhesion force, respectively.
Figure 3B:
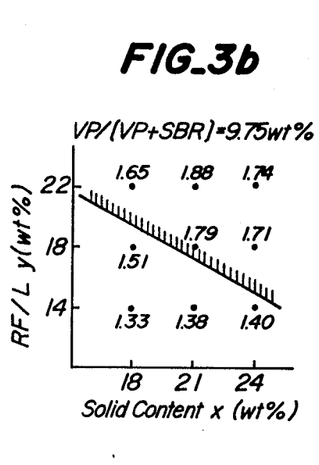
Figure 3C:
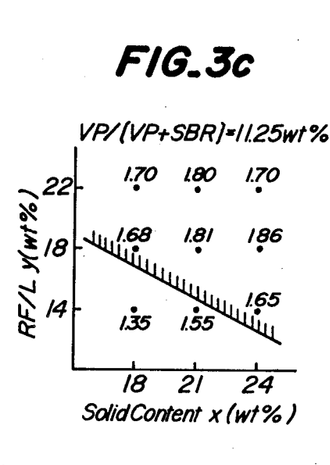
Figure 7A:
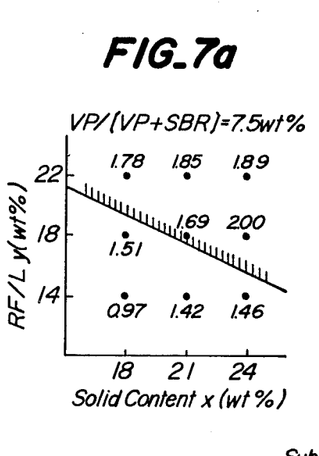
FIGS. 7a to 7c are graphs showing a relation between the composition of the dipping solution and adhesion force, respectively.
Figure 7B:
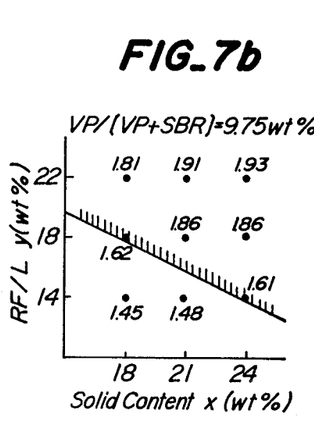
Figure 7C:
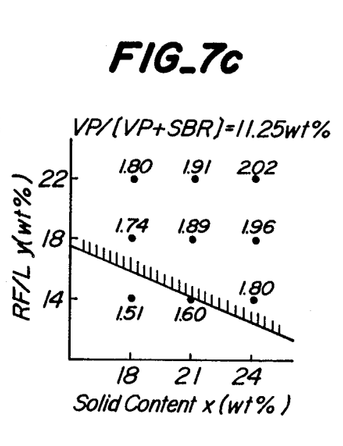

FIGS. 3a to 3c show relations among various compositions of the dipping solution and the adhesion force when the temperature and tension in the stretch heating treatment of the cord made from the super-high strength nylon-6 are 150° C. and 1.0 g/d before the application or impregnation of the dipping solution, respectively. On the other hand, FIGS. 7a to 7c show relations among various compositions of the dipping solution and the adhesion force when the temperature and tension in the stretch heating treatment of the cord made from the super-high strength nylon-6,6 are 180° C. and 1.0 g/d before the application or impregnation of the dipping solution, respectively. In any case, the strength of the dipped cord under the above conditions is approximately 29~30 kg/cord as compared with 30 kg/cord of the raw cord irrespectively of the composition of the dipping solution.

As shown in FIGS. 3a to 3c or 7a to 7c, the inventors have found out that as to the influence of the dipping solution of resorcin-formaldehyde-latex (hereinafter referred to as RFL) upon the adhesion force, ratio (weight %) of total weight of resorcin and formaldehyde to weight of latex in the dipping solution, i.e. (resorcin+formaldehyde) ×100/latex (hereinafter referred to as RF/L), the solid content in the dipping solution and the content of vinylpyridine latex in the dipping solution are particularly large factors, and confirmed that the high adhesion force of the cord when the dipping treatment is carried out after the stretch heating treatment or heat rolling treatment is obtained as RF/L becomes large and the solid content becomes large and further the content of vinylpyridine latex (hereinafter referred to as VP) in the latex is large.

As mentioned above, the adhesion force of the cord subjected to the stretch heating treatment is largely dependent upon RF/L, solid content and VP content in the dipping solution. In this connection, the inventors have found out that when the dipping solution satisfies only one of the above three factors, the adhesion force is not improved and the strong adhesion force between rubber and cord is first obtained by combining the above three factors. Now, the inventors have made further studies based on the above knowledge and found that when the RF/L (weight %) and solid content (weight %) satisfy the aforementioned relation (2) or (5), the adhesion level not coming into problem in the tire can be ensured, and further clarified that b in the relation (2) or (5) is dependent upon the VP content, i.e. VP×100/[SBR+VP] (weight %). Moreover, SBR is a content of styrene-butadiene copolymer latex. For the convenience, the VP content merely shows VP/[SBR+VP].

Figure 8:
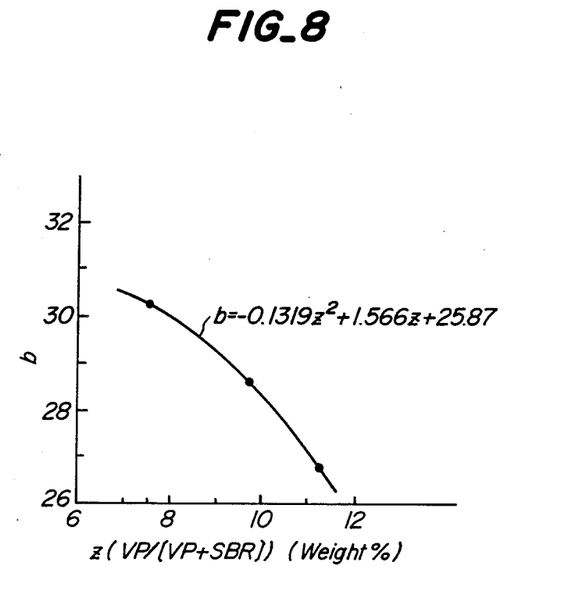
FIG. 8 is a graph showing a relation between z [VP/(SBR+VP)] and b.

In the relation (2) or (5), b is dependent upon the VP content, and as the VP content becomes larger, even if b is a small value, good adhesion force is obtained. In other words, even if RF/L is small or the solid content is small, the strong adhesion force can be obtained. As shown in FIG. 4 or 8, b and VP/[SBR+VP] or z (weight %) satisfy the aforementioned relation (3) or (6).

As seen from the above, in order to ensure the adhesion force of not less than 1.6 kg/cord not coming into problem from a viewpoint of the tire safety, when the solid content x (weight %), RF/L y (weight %) and VP content z (weight %) in the dipping solution satisfy the above relations (2) and (3) or (5) and (6), the strong adhesion force between rubber and cord can be first given to the super-high strength nylon-6 or nylon-6,6 cord subjected to the stretch heating treatment before the application or impregnation of the dipping solution.

In general, the dipping solution is used after about 24 hours starting from the aging. In this dipping solution, when VP/[SBR+VP] is not more than 12% by weight, the adhesion force is improved, but when it exceeds 12% by weight, the viscosity of the dipping solution undesirably rises and the uniform application of the dipping solution to the cord is difficult and the adhesion force rather lowers. Furthermore, when the VP content is not less than 13.5% by weight, the dipping solution is gelated in 3 days after the aging. In any case, VP/[SBR+VP] is preferable to be not more than 12% by weight. Particularly, VP/[SBR+VP] is within a range of 7.5% by weight≦VP/[SBR+VP]≦12% by weight from a viewpoint of the improvement of the adhesion force.

Moreover, when the solid content in the dipping solution exceeds 26% by weight, the viscosity of the dipping solution rises to cause the uneven adhesion of the solution and also the gelation is caused. Therefore, the solid content is preferable to be within a range of 16–26% by weight.

The invention will be described in detail with reference to the following examples and comparative examples.

Figure 9:
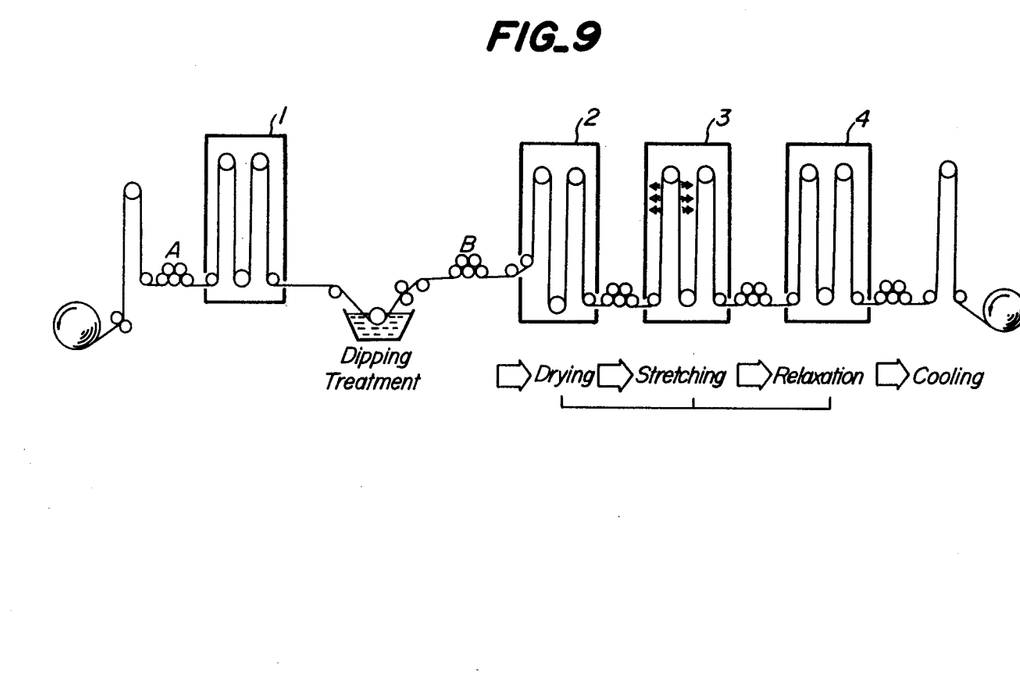
FIG. 9 is a diagrammatical view showing an embodiment of the progress for treating the super-high strength nylon cord inclusive of the stretch heating treatment according to the invention.

The outline of the dipping method including the stretch heating treatment before the application or impregnation of the dipping solution according to the invention is shown in FIG. 9. In each of the following examples and comparative examples, the stretch heating treatment is carried out by selecting the tension of the cord between pull rolls at positions A and B and heating the stretch heating zone 1 to a given temperature before the immersion into the dipping solution. Thereafter, the cord is immersed int he dipping solution in a dipping tank and then successively treated in a drying zone 2 at 130° C. under a tension of 1.3 g/d for 120 seconds, a stretching zone 3 at 200° C. (235° C. in case of nylon-6,6) under a tension of 1.3 g/d for 40 seconds and a relaxation zone 4 at 195° C. (230° C. in case of nylon-6,6) under a tension of 1.0 g/d for 40 seconds.

Figure 10:
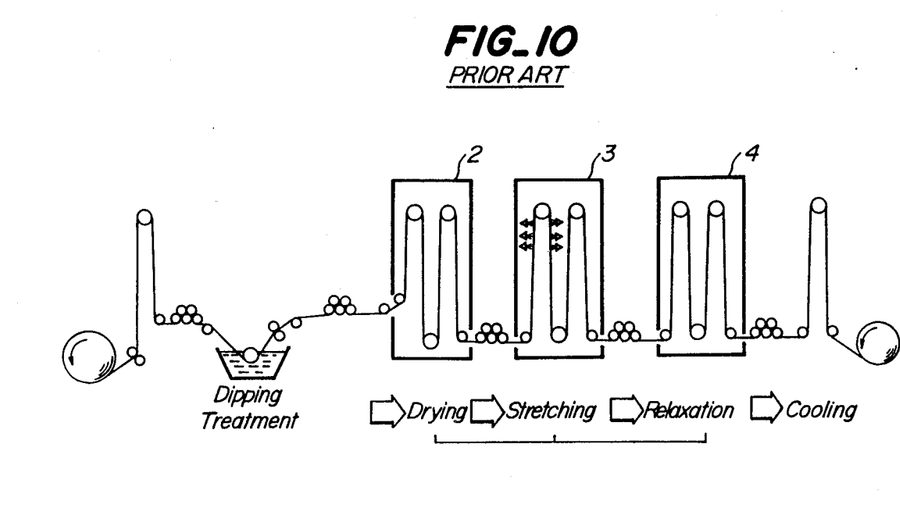
FIG. 10 is a diagrammatical view showing the conventional treating step.

For comparison, the conventional dipping method is shown in FIG. 10, wherein the temperature, time and tension in the drying zone 2, stretching zone 3 and relaxation zone 4 are 130° C.×120 seconds×1.3 g/d, 200° C. (235° C.)×40 seconds×1.3 g/d and 195° C. (230° C.)×40 seconds×1.0 g/d, respectively, and the tension of the cord during the immersion into the dipping solution is about 0.1 g/d.

As a cord to be tested, there were used the conventional nylon-6 cord, super-high strength nylon-6 cord, conventional nylon-6,6 cord and super-high strength nylon-6,6 cord, which has a twisting structure of 1260 d/2 and a twisting pitch of 39×39 turns/10 cm. The strengths of the raw cords were 21.5 kg/cord and 30 kg/cord, respectively.

Moreover, the strength of the cord after the dipping and the adhesion force to rubber thereof were measured as follows.

(1) Cord strength

The cord just after the dipping was tensioned at room temperature by means of an autograph according to JIS L1017 and the strength at break was measured.

Moreover, the raw yarn denier before the twisting was used as a cord denier because the change of cord weight was predicted due to the twisting shrinkage of the twisted yarn, the adhesion of the dipping solution or the like.

(2) Adhesion force

The treated cords embedded in an unvulcanized rubber composition having the following compounding recipe, which was cured at 145° C. under a pressure of 20 kg/cm$^2$ for 30 minutes. The cord was turned up and peeled off from the resulting vulcanizate at a rate of 30 cm/min, during which the peel strength was measured as an adhesive force (kg/cord).

|  | part by weight |
|---|---|
| natural rubber | 80 |
| styrene-butadiene copolymer rubber | 20 |
| carbon black | 40 |
| stearic acid | 2 |
| petroleum softener | 10 |
| pine tar | 4 |
| zinc white | 5 |
| N-phenyl-β-naphthylamine | 1.5 |
| 2-benzothiazorylsulfide | 0.75 |
| diphenylguanidine | 0.75 |

COMPARATIVE EXAMPLES 1~72

In all of these comparative examples, the cord was treated with the conventional dipping solution having the following compounding recipe:

|  | (parts by weight) |
|---|---|
| rosorcin | 14.9 |
| 37% aqueous solution of formaldehyde | 19.0 |
| 10% aqueous solution of sodium hydroxide | 18.2 |
| vinylpyridine latex *1 | 195.4 |
| styrene-butadiene copolymer latex *2 | 195.4 |
| soft water | 562.0 |
| total | 1000.0 |

*1: latex made by Japan Synthetic Rubber Co., Ltd. trade name: JSR0650
*2: latex made by Japan Synthetic Rubber Co., Ltd. trade name: JSR2108

This dipping solution was prepared as follows. At first, resorcin was dissolved in 238.0 parts by weight of soft water, to which was added 10% aqueous solution of sodium hydroxide with stirring and further 37% aqueous solution of formaldehyde. The resulting solution was aged at 25° C. for 6 hours to obtain a solution A. On the other hand, the latexes were added to 324 parts by weight of the remaining soft water to obtain a solution B. The solution A was added to the solution B, which was further aged at 25° C. for 24 hours to prepare the conventional RFL dipping solution. This dipping solution had RF/L of 16% by weight, solid content of 18% by weight and VP/[VP+SBR] of 7.5% by weight.

The dipping method as shown in FIG. 10 was adopted in Comparative Examples 1, 2, 34 and 35, while the dipping method as shown in FIG. 9 was adopted in the remaining Comparative Examples 3 to 33 and 36 to 72 under the same conditions as previously mentioned.

The treatment with an adhesive was carried out under conditions as shown in the following Tables 1 and 2 and the strength and adhesion force of the thus obtained dipped cords were measured to obtain results as shown in Tables 1 and 2.

TABLE 1

|  |  | Kind of cord* | Presence of stretch heating treatment | Stretch heating zone temperature (°C.) | tension (g/d) | Cord strength (kg/cord) | Adhesion force kg/cord |
|---|---|---|---|---|---|---|---|
| Comparative Example | 1 | conventional | absence | — | — | 21.5 | 2.1 |
|  | 2 | super | absence | — | — | 24.2 | 2.0 |
|  | 3 | conventional | presence | 150 | 1.0 | 21.6 | 1.10 |
|  | 4 | super | presence | 35 | 0.2 | 25.5 | 1.70 |
|  | 5 | super | presence | 35 | 0.35 | 26.1 | 1.65 |
|  | 6 | super | presence | 35 | 0.5 | 27.1 | 1.65 |
|  | 7 | super | presence | 35 | 0.75 | 27.5 | 1.35 |
|  | 8 | super | presence | 35 | 1.0 | 28.8 | 1.25 |
|  | 9 | super | presence | 35 | 1.5 | 29.8 | 1.10 |
|  | 10 | super | presence | 60 | 0.2 | 26.4 | 1.70 |
|  | 11 | super | presence | 60 | 0.35 | 27.1 | 1.65 |
|  | 12 | super | presence | 60 | 0.5 | 27.2 | 1.55 |
|  | 13 | super | presence | 60 | 0.75 | 27.7 | 1.35 |
|  | 14 | super | presence | 60 | 1.0 | 28.8 | 1.25 |
|  | 15 | super | presence | 60 | 1.5 | 30.0 | 1.05 |
|  | 16 | super | presence | 100 | 0.2 | 27.2 | 1.65 |
|  | 17 | super | presence | 100 | 0.35 | 27.3 | 1.55 |
|  | 18 | super | presence | 100 | 0.5 | 27.4 | 1.50 |
|  | 19 | super | presence | 100 | 0.75 | 28.0 | 1.35 |
|  | 20 | super | presence | 100 | 1.0 | 29.2 | 1.20 |
|  | 21 | super | presence | 100 | 1.5 | 30.2 | 1.00 |
|  | 22 | super | presence | 150 | 0.2 | 27.2 | 1.65 |
|  | 23 | super | presence | 150 | 0.35 | 27.4 | 1.40 |
|  | 24 | super | presence | 150 | 0.5 | 28.0 | 1.35 |
|  | 25 | super | presence | 150 | 0.75 | 28.8 | 1.25 |
|  | 26 | super | presence | 150 | 1.0 | 29.5 | 1.10 |
|  | 27 | super | presence | 150 | 1.5 | 30.1 | 0.90 |
|  | 28 | super | presence | 200 | 0.2 | 27.3 | 1.25 |
|  | 29 | super | presence | 200 | 0.35 | 27.7 | 1.20 |
|  | 30 | super | presence | 200 | 0.5 | 28.0 | 1.15 |
|  | 31 | super | presence | 200 | 0.75 | 29.2 | 1.10 |
|  | 32 | super | presence | 200 | 1.0 | 29.7 | 1.05 |
|  | 33 | super | presence | 200 | 1.5 | 30.2 | 0.75 |

*The "conventional" is the conventional nylon-6 cord, and the "super" is the super-high strength nylon-6 cord.

TABLE 1

|  |  | Kind of cord* | Presence of stretch heating treatment | Stretch heating zone temperature (°C.) | tension (g/d) | Cord strength (kg/cord) | Adhesion force kg/cord |
|---|---|---|---|---|---|---|---|
| Comparative Example | 34 | conventional | absence | — | — | 21.5 | 2.2 |
|  | 35 | super | absence | — | — | 24.7 | 2.1 |
|  | 36 | conventional | presence | 150 | 1.0 | 21.6 | 1.18 |
|  | 37 | super | presence | 35 | 0.2 | 25.2 | 1.83 |
|  | 38 | super | presence | 35 | 0.35 | 25.7 | 1.76 |
|  | 39 | super | presence | 35 | 0.5 | 26.4 | 1.66 |
|  | 40 | super | presence | 35 | 0.75 | 27.2 | 1.51 |
|  | 41 | super | presence | 35 | 1.0 | 27.4 | 1.38 |
|  | 42 | super | presence | 35 | 1.5 | 27.5 | 1.05 |
|  | 43 | super | presence | 60 | 0.2 | 25.6 | 1.83 |
|  | 44 | super | presence | 60 | 0.35 | 26.3 | 1.75 |
|  | 45 | super | presence | 60 | 0.5 | 26.7 | 1.66 |
|  | 46 | super | presence | 60 | 0.75 | 27.4 | 1.52 |
|  | 47 | super | presence | 60 | 1.0 | 27.8 | 1.38 |
|  | 48 | super | presence | 60 | 1.5 | 28.8 | 1.03 |
|  | 49 | super | presence | 100 | 0.2 | 26.1 | 1.72 |
|  | 50 | super | presence | 100 | 0.35 | 26.2 | 1.68 |
|  | 51 | super | presence | 100 | 0.5 | 27.3 | 1.62 |
|  | 52 | super | presence | 100 | 0.75 | 28.2 | 1.45 |
|  | 53 | super | presence | 100 | 1.0 | 28.7 | 1.27 |
|  | 54 | super | presence | 100 | 1.5 | 29.2 | 1.04 |
|  | 55 | super | presence | 150 | 0.2 | 26.5 | 1.57 |
|  | 56 | super | presence | 150 | 0.35 | 27.1 | 1.52 |
|  | 57 | super | presence | 150 | 0.5 | 27.7 | 1.47 |
|  | 58 | super | presence | 150 | 0.75 | 28.6 | 1.35 |
|  | 59 | super | presence | 150 | 1.0 | 29.2 | 1.23 |
|  | 60 | super | presence | 150 | 1.5 | 29.6 | 0.98 |
|  | 61 | super | presence | 200 | 0.2 | 26.8 | 1.35 |
|  | 62 | super | presence | 200 | 0.35 | 27.5 | 1.31 |
|  | 63 | super | presence | 200 | 0.5 | 28.2 | 1.26 |

TABLE 1-continued

| Kind of cord | * | Presence of stretch heating treatment | Stretch heating zone temperature (°C.) | tension (g/d) | Cord strength (kg/cord) | Adhesion force kg/cord |
|---|---|---|---|---|---|---|
| 64 | super | presence | 200 | 0.75 | 28.8 | 1.18 |
| 65 | super | presence | 200 | 1.0 | 29.5 | 1.01 |
| 66 | super | presence | 200 | 1.5 | 29.7 | 0.95 |
| 67 | super | presence | 230 | 0.2 | 26.9 | 1.23 |
| 68 | super | presence | 230 | 0.35 | 27.7 | 1.18 |
| 69 | super | presence | 230 | 0.5 | 28.5 | 1.15 |
| 70 | super | presence | 230 | 0.75 | 29.0 | 1.05 |
| 71 | super | presence | 230 | 1.0 | 29.5 | 0.96 |
| 72 | super | presence | 230 | 1.5 | 29.7 | 0.90 |

*The "conventional" is the conventional nylon 6,6 cord, and the "super" is the super high strength nylon-6,6 cord.

As seen from the results of Tables 1 and 2, in Comparative Examples 1 and 35 using the conventional dipping method, the strength reduction in the dipped cords made from the conventional nylon-6 and nylon-6,6 was not observed and the adhesion force was good. On the other hand, in Comparative Examples 2 and 35 using the conventional dipping method, the adhesion force was out of the question, but the strength of the raw cord of 30 kg/cord reduced to 24.2 kg/cord in case of nylon-6 and 24.7 kg/cord in case of nylon-6,6.

In Comparative Examples 3 and 36, the stretch heating treatment according to the invention was applied to the conventional nylon-6 and nylon-6,6 cords before the dipping. In this case, the strength of the dipped cord was approximately equal to that of the raw cord, but the adhesion force largely reduced.

In Comparative Examples 4 to 33 and 37 to 72, the stretch heating treatment according to the invention was applied to the super-high strength nylon-6 or nylon-6,6 cords before the dipping. In this case, the following was confirmed from the measured results of the strength and adhesion force of the dipped cords.

As the temperature or the tension in the stretch heating treatment before the dipping becomes higher, the strength of the dipped cord becomes high. Particularly, the strength of the dipped cord of not less than 27.5 kg/cord can be ensured when the temperature and tension in the stretch heating treatment satisfy the following relation:

$$T \geq 84/S - 80 \quad (1)$$
(in case of super-high strength nylon-6)
$$T \geq 84/S - 49 \quad (4)$$
(in case of super-high strength nylon-6,6)

(wherein T is a temperature (°C.) in the stretch heating treatment of the cord and S is a tension (g/d) in the stretch heating treatment of the cord). However, the adhesion force to rubber largely reduces under such a condition.

EXAMPLES 1 TO 38, COMPARATIVE EXAMPLES 73 TO 89

The composition (parts by weight) of the dipping solution used in all of these examples and comparative examples is shown in the following Table 3.

TABLE 3(a)

| | | | | | | | | | | | | | | |
|---|---|---|---|---|---|---|---|---|---|---|---|---|---|---|
| solid content (wt %) | 18 | 18 | 18 | 18 | 18 | 18 | 18 | 18 | 18 | 21 | 21 | 21 | 21 | 21 |
| RF/L (wt %) | 14 | 14 | 14 | 18 | 18 | 18 | 22 | 22 | 22 | 14 | 14 | 14 | 18 | 18 |
| VP/VP + SBR (wt %) | 7.5 | 9.75 | 11.25 | 7.5 | 9.75 | 11.25 | 7.5 | 9.75 | 11.25 | 7.5 | 9.75 | 11.25 | 7.5 | 9.75 |
| resorcin | 14.86 | 14.86 | 14.86 | 18.41 | 18.41 | 18.41 | 21.72 | 21.72 | 21.72 | 17.34 | 17.34 | 17.34 | 21.48 | 21.48 |
| formaldehyde (37% aqueous solution) | 18.98 | 18.98 | 18.98 | 23.52 | 23.52 | 23.52 | 27.74 | 27.74 | 27.74 | 22.14 | 22.14 | 22.14 | 27.44 | 27.44 |
| SBR latex (JSR 2108) | 195.37 | 136.76 | 97.69 | 188.29 | 131.80 | 94.14 | 181.70 | 127.19 | 90.85 | 227.94 | 159.55 | 113.97 | 219.67 | 153.77 |
| VP latex (JSR 0650) | 190.61 | 247.79 | 285.91 | 188.29 | 238.81 | 275.55 | 177.27 | 230.45 | 265.90 | 222.38 | 289.09 | 333.56 | 214.31 | 278.61 |
| NaOH (10% aqueous solution) | 18.20 | 18.20 | 18.20 | 22.55 | 22.55 | 22.55 | 26.60 | 26.60 | 26.60 | 21.23 | 21.33 | 21.33 | 26.31 | 26.31 |
| soft water | 561.98 | 563.41 | 564.36 | 563.53 | 564.91 | 565.83 | 564.98 | 566.31 | 567.19 | 488.98 | 490.65 | 491.76 | 490.79 | 492.40 |
| total | 1000 | 1000 | 1000 | 1000 | 1000 | 1000 | 1000 | 1000 | 1000 | 1000 | 1000 | 1000 | 1000 | 1000 |

TABLE 3(b)

| | | | | | | | | | | | | | | |
|---|---|---|---|---|---|---|---|---|---|---|---|---|---|---|
| solid content (wt %) | 21 | 21 | 21 | 21 | 24 | 24 | 24 | 24 | 24 | 24 | 24 | 24 | 24 | |
| RF/L (wt %) | 18 | 22 | 22 | 22 | 14 | 14 | 14 | 18 | 18 | 18 | 22 | 22 | 22 | |
| VP/VP + SBR (wt %) | 11.25 | 7.5 | 9.75 | 11.25 | 7.5 | 9.75 | 11.25 | 7.5 | 9.75 | 11.25 | 7.5 | 9.75 | 11.25 | |
| resorcin | 21.48 | 25.34 | 25.34 | 25.34 | 19.81 | 19.81 | 19.81 | 24.55 | 24.55 | 24.55 | 28.95 | 28.95 | 28.95 | |
| formaldehyde (37% aqueous solution) | 27.44 | 32.36 | 32.36 | 32.36 | 25.31 | 25.31 | 25.31 | 31.36 | 31.36 | 31.36 | 36.99 | 36.99 | 36.99 | |
| SBR latex | 109.84 | 211.98 | 148.39 | 105.99 | 260.50 | 182.35 | 130.25 | 251.05 | 175.74 | 125.53 | 242.27 | 169.59 | 121.13 | |

TABLE 3(b)-continued

| | | | | | | | | | | | | | |
|---|---|---|---|---|---|---|---|---|---|---|---|---|---|
| (JSR 2108) | | | | | | | | | | | | | |
| VP latex (JSR 0650) | 321.47 | 206.81 | 268.86 | 310.22 | 254.14 | 330.39 | 381.22 | 244.93 | 318.41 | 367.39 | 236.36 | 307.27 | 354.54 |
| NaOH (10% aqueous solution) | 26.31 | 31.03 | 31.03 | 31.03 | 24.27 | 24.27 | 24.27 | 30.07 | 30.07 | 30.07 | 35.46 | 35.46 | 35.46 |
| soft water | 493.47 | 492.43 | 494.02 | 495.06 | 415.97 | 417.88 | 419.15 | 418.04 | 419.88 | 421.11 | 419.97 | 421.74 | 422.92 |
| total 1000 | 1000 | 1000 | 1000 | 1000 | 1000 | 1000 | 1000 | 1000 | 1000 | 1000 | 1000 | 1000 | |

Each of the above dipping solutions was prepared as follows. At first, soft water was weighed so that the amount of resorcin was 5% by weight to soft water (pH=7.0), to which was dissolved resorcin and then 37% aqueous solution of formaldehyde and 10% aqueous solution of sodium hydroxide were added. The resulting solution was aged at room temperature of 25° C.±2° C. for 6 hours to obtain a solution A. On the other hand, the remaining soft water was added and mixed with the latexes to obtain a solution B. The solution B was added and mixed with the solution A to obtain a given dipping solution. Moreover, in the preparation of the solution A, if the weight of resorcin was more than 5%, resorcin was dissolved in total amount of soft water to prepare an aqueous solution of more than 5% by weight of resorcin.

The VP/[VP+SBR], solid content and RF/L of the obtained dipping solutions are shown in the following Tables 4 and 5. Moreover, VP/[VP+SBR] in Tables 4 and 5 was concretely selected as follows. For example, the vinylpyridine content of latex JSR0650, trade name, (solid content: 40% by weight) was 15% by weight of the solid content, while vinylpyridine was not included in the latex JSR2108, trade name, (solid content: 40% by weight). Therefore, when 100 g of JSR0650 latex and 100 g of JSR2108 latex were used, VP/[VP+SBR] was 7.5% by weight from the relation of the following formula:

$$VP/VP+SBR \times 100 = [100 \times 0.4 \times 0.15/(100+100) \times 0.4] \times 100 = 7.5$$

The cords to be tested in Examples 1 to 18 and Comparative Examples 73 to 82 were the super-high strength nylon-6 cords, and the dipping method as shown in FIG. 9 was carried out under the same conditions as mentioned above except that the temperature and tension in the stretch heating treatment were 150° C. and 1 g/d. On the other hand, the cords to be tested in Examples 19 to 38 and Comparative Examples 83 to 89 were the super-high strength nylon-6,6 cords, and the dipping method as shown in FIG. 9 was carried out under the same conditions as mentioned above except that the temperature and tension in the stretch heating treatment were 180° C. and 1 g/d.

The strength and adhesion force of the dipped cords were measured to obtain results as shown in Tables 4 and 5.

TABLE 4

| | Dipping solution | | | Adhesion force (kg/cord) | Cord strength (kg/cord) |
|---|---|---|---|---|---|
| | VP/[VP + SBR] (wt %) | solid content (wt %) | RF/L (wt %) | | |
| Comparative Example 73 | 7.5 | 18 | 14 | 0.83 | 29.3 |
| Comparative Example 74 | 7.5 | 18 | 18 | 1.36 | 29.7 |
| Example 1 | 7.5 | 18 | 22 | 1.67 | 29.6 |
| Comparative Example 75 | 7.5 | 21 | 14 | 1.30 | 29.4 |
| Example 2 | 7.5 | 21 | 18 | 1.60 | 29.5 |
| Example 3 | 7.5 | 21 | 22 | 1.77 | 29.6 |
| Comparative Example 76 | 7.5 | 24 | 14 | 1.38 | 29.5 |
| Example 4 | 7.5 | 24 | 18 | 1.89 | 29.3 |
| Example 5 | 7.5 | 24 | 22 | 1.78 | 29.6 |
| Comparative Example 77 | 9.75 | 18 | 14 | 1.33 | 29.5 |
| Comparative Example 78 | 9.75 | 18 | 18 | 1.51 | 29.6 |
| Example 6 | 9.75 | 18 | 22 | 1.65 | 29.4 |
| Comparative Example 79 | 9.75 | 21 | 14 | 1.38 | 29.3 |
| Example 7 | 9.75 | 21 | 18 | 1.79 | 29.1 |
| Example 8 | 9.75 | 21 | 22 | 1.88 | 29.4 |
| Comparative Example 80 | 9.75 | 24 | 14 | 1.40 | 29.3 |
| Example 9 | 9.75 | 24 | 18 | 1.71 | 29.2 |
| Example 10 | 9.75 | 24 | 22 | 1.74 | 29.7 |
| Comparative Example 81 | 11.25 | 18 | 14 | 1.35 | 29.5 |
| Example 11 | 11.25 | 18 | 18 | 1.68 | 29.1 |
| Example 12 | 11.25 | 18 | 22 | 1.70 | 29.2 |
| Comparative Example 82 | 11.25 | 21 | 14 | 1.55 | 29.6 |
| Example 13 | 11.25 | 21 | 18 | 1.81 | 29.5 |
| Example 14 | 11.25 | 21 | 22 | 1.80 | 29.3 |
| Example 15 | 11.25 | 24 | 14 | 1.65 | 29.8 |
| Example 16 | 11.25 | 24 | 18 | 1.86 | 29.4 |

TABLE 4-continued

| | Dipping solution | | | Adhesion force (kg/cord) | Cord strength (kg/cord) |
|---|---|---|---|---|---|
| | VP/[VP + SBR] (wt %) | solid content (wt %) | RF/L (wt %) | | |
| Example 17 | 11.25 | 24 | 22 | 1.90 | 29.4 |
| Example 18 | 12 | 21 | 22 | 2.00 | 29.5 |

TABLE 5

| | Dipping solution | | | Adhesion force (kg/cord) | Cord strength (kg/cord) |
|---|---|---|---|---|---|
| | VP/[VP + SBR] (wt %) | solid content (wt %) | RF/L (wt %) | | |
| Comparative Example 83 | 7.5 | 18 | 14 | 0.97 | 29.8 |
| Comparative Example 84 | 7.5 | 18 | 18 | 1.51 | 29.6 |
| Example 19 | 7.5 | 18 | 22 | 1.78 | 29.7 |
| Comparative Example 85 | 7.5 | 21 | 14 | 1.42 | 29.4 |
| Example 20 | 7.5 | 21 | 18 | 1.69 | 29.7 |
| Example 21 | 7.5 | 21 | 22 | 1.85 | 29.3 |
| Comparative Example 86 | 7.5 | 24 | 14 | 1.46 | 29.1 |
| Example 22 | 7.5 | 24 | 18 | 2.00 | 28.9 |
| Example 23 | 7.5 | 24 | 22 | 1.89 | 29.5 |
| Comparative Example 87 | 9.75 | 18 | 14 | 1.45 | 29.3 |
| Example 24 | 9.75 | 18 | 18 | 1.62 | 28.8 |
| Example 25 | 9.75 | 18 | 22 | 1.81 | 29.6 |
| Comparative Example 88 | 9.75 | 21 | 14 | 1.48 | 29.7 |
| Example 26 | 9.75 | 21 | 18 | 1.86 | 29.2 |
| Example 27 | 9.75 | 21 | 22 | 1.91 | 29.6 |
| Example 28 | 9.75 | 24 | 14 | 1.61 | 28.9 |
| Example 29 | 9.75 | 24 | 18 | 1.89 | 28.8 |
| Example 30 | 9.75 | 24 | 22 | 1.93 | 29.5 |
| Comparative Example 89 | 11.25 | 18 | 14 | 1.51 | 29.6 |
| Example 31 | 11.25 | 18 | 18 | 1.74 | 29.4 |
| Example 32 | 11.25 | 18 | 22 | 1.80 | 29.8 |
| Example 33 | 11.25 | 21 | 14 | 1.60 | 29.2 |
| Example 34 | 11.25 | 21 | 18 | 1.89 | 29.5 |
| Example 35 | 11.25 | 21 | 22 | 1.91 | 28.9 |
| Example 36 | 11.25 | 24 | 14 | 1.80 | 29.6 |
| Example 37 | 11.25 | 24 | 18 | 1.96 | 29.3 |
| Example 38 | 11.25 | 24 | 22 | 2.02 | 29.1 |

As seen from Tables 4 and 5, in all examples and comparative examples, the super-high strength nylon-6 or nylon-6,6 cords were subjected to the stretch heating treatment according to the invention before the dipping. In this case, the strength of the dipped cord was not less than 29 kg/cord in the nylon-6 and not less than 28.8 kg/cord in the nylon-6,6, but the adhesion force was changed by the composition of the dipping solution. Particularly, the high adhesion force was obtained as the vinylpyridine latex content as VP/VP+SBR became large or the ratio of resorcin and formaldehyde to latex as RF/L became high or the solid content in the dipping solution became high. From these measured results, it has been found that in order to ensure the adhesion force of 1.6 kg/cord not coming into problem as a tire reinforcing cord, the dipping solution is necessary to satisfy the following relations (2) and (3) in case of the super-high strength nylon-6 cord or (5) and (6) in case of the super-high strength nylon-6,6 cord:

$$y \geq -0.75x + b \tag{2}$$

$$b = -0.274z^2 + 4.28z + 16.8 \tag{3}$$

or $$y \geq -0.61x + b \tag{5}$$

$$b = -0.1319z^2 + 1.566z + 25.87 \tag{6}$$

(wherein x is a solid content (weight %) in the dipping solution, y is RF/L (weight %) in the dipping solution and z is VP/VP+SBR (weight %) in the dipping solution).

EXAMPLES 39 TO 50, COMPARATIVE EXAMPLES 90 TO 115

The super-high strength nylon-6 cords were subjected to a stretch heating treatment under 60° C.×0.35 g/d, 150° C.×0.5 g/d, 60° C.×1.0 g/d or 150° C.×1.0 g/d as shown in the following Table 6 and further to a dipping treatment in the dipping solution having the solid content of 18 or 24% by weight, RF/L of 14 or 22% by weight and VP/VP+SBR of 7.5, 9.75 or 11.25% by weight. The strength and adhesion force of the dipped cords obtained under the above conditions were measured to obtain results as shown in Table 6.

For the comparison, the measured results of Examples 5, 10 and 17 and Comparative Examples 73, 77 and 81 are also shown in Table 6.

The super-high strength nylon-6,6 cords were subjected to a stretch heating treatment under 60° C.×0.35 g/d, 180° C.×0.5 g/d, 60° C.×1.0 g/d or 180° C.×1.0 g/d as shown in the following Table 7 and further to a dipping treatment in the dipping solution having the solid content of 18 or 24% by weight, RF/L of 14 or 22% by weight and VP/VP+SBR of 7.5, 9.75 or 11.25% by weight. The strength and adhesion force of the dipped cords obtained under the above conditions were measured to obtain results as shown in Table 7.

For the comparison, the measured results of Examples 23, 30 and 38 and Comparative Examples 83, 87 and 89 are also shown in Table 7.

TABLE 6

| | Kind of cord | Stretch heating zone | | | Dipping solution | | | | Cord strength (kg/cord) | Adhesion force (kg/cord) |
|---|---|---|---|---|---|---|---|---|---|---|
| | | temperature T (°C.) | tension S (g/d) | 84/S-80 | content x (wt %) | RF/L y (wt %) | VP/[VP + SBR] z (wt %) | −0.75 × + b | | |
| Comparative Example 90 | super | 60 | 0.35 | 160 | 18 | 14 | 7.5 | 20 | 27.1 | 1.05 |
| Comparative Example 91 | super | 60 | 0.35 | 160 | 24 | 22 | 7.5 | 15.5 | 27.3 | 1.82 |
| Comparative Example 92 | super | 60 | 0.35 | 160 | 18 | 14 | 9.75 | 19 | 27.2 | 1.35 |
| Comparative Example 93 | super | 60 | 0.35 | 160 | 24 | 22 | 9.75 | 14.5 | 27.0 | 1.80 |
| Comparative Example 94 | super | 60 | 0.35 | 160 | 18 | 14 | 11.25 | 18.05 | 27.1 | 1.37 |
| Comparative Example 95 | super | 60 | 0.35 | 160 | 24 | 22 | 11.25 | 13.55 | 27.3 | 1.91 |
| Comparative Example 96 | super | 150 | 0.5 | 88 | 18 | 14 | 7.5 | 20 | 28.2 | 0.92 |
| Example 39 | super | 150 | 0.5 | 88 | 24 | 22 | 7.5 | 15.5 | 28.1 | 1.80 |
| Comparative Example 97 | super | 150 | 0.5 | 88 | 18 | 14 | 9.75 | 19 | 27.9 | 1.36 |
| Example 40 | super | 150 | 0.5 | 88 | 24 | 22 | 9.75 | 14.5 | 28.2 | 1.79 |
| Comparative Example 98 | super | 150 | 0.5 | 88 | 18 | 14 | 11.25 | 18.05 | 27.9 | 1.39 |
| Example 41 | super | 150 | 0.5 | 88 | 24 | 22 | 11.25 | 13.55 | 28.2 | 1.95 |
| Comparative Example 99 | super | 60 | 1.0 | 4 | 18 | 14 | 7.5 | 20 | 28.7 | 0.98 |
| Example 42 | super | 60 | 1.0 | 4 | 24 | 22 | 7.5 | 15.5 | 28.6 | 1.78 |
| Comparative Example 100 | super | 60 | 1.0 | 4 | 18 | 14 | 9.75 | 19 | 28.9 | 1.35 |
| Example 43 | super | 60 | 1.0 | 4 | 24 | 22 | 9.75 | 14.5 | 28.4 | 1.80 |
| Comparative Example 101 | super | 60 | 1.0 | 4 | 18 | 14 | 11.25 | 18.05 | 28.3 | 1.41 |
| Example 44 | super | 60 | 1.0 | 4 | 24 | 22 | 11.25 | 13.55 | 28.6 | 1.93 |
| Comparative Example 102 | conventional | 150 | 1.0 | 4 | 24 | 22 | 11.25 | 13.05 | 21.5 | 1.99 |
| Comparative Example 73 | super | 150 | 1.0 | 4 | 18 | 14 | 7.5 | 20 | 29.3 | 0.83 |
| Example 5 | super | 150 | 1.0 | 4 | 24 | 22 | 7.5 | 15.5 | 29.6 | 1.78 |
| Comparative Example 77 | super | 150 | 1.0 | 4 | 18 | 14 | 9.75 | 19 | 29.5 | 1.33 |
| Example 10 | super | 150 | 1.0 | 4 | 24 | 22 | 9.75 | 14.5 | 29.7 | 1.74 |
| Comparative Example 81 | super | 150 | 1.0 | 4 | 18 | 14 | 11.25 | 18.05 | 29.5 | 1.35 |
| Example 17 | super | 150 | 1.0 | 4 | 24 | 22 | 11.25 | 13.05 | 29.4 | 1.90 |

TABLE 7

| | Kind of cord | Stretch heating zone | | | Dipping solution | | | | Cord strength (kg/cord) | Adhesion force (kg/cord) |
|---|---|---|---|---|---|---|---|---|---|---|
| | | temperature T (°C.) | tension S (g/d) | 87/S-49 | solid content x (wt %) | RF/L y (wt %) | VP/[VP + SBR] z (wt %) | −0.61 × + b | | |
| Comparative Example 103 | super | 60 | 0.35 | 199.6 | 18 | 14 | 7.5 | 19.2 | 25.0 | 1.75 |
| Comparative Example 104 | super | 60 | 0.35 | 199.6 | 24 | 22 | 7.5 | 15.6 | 25.6 | 2.03 |
| Comparative Example 105 | super | 60 | 0.35 | 199.6 | 18 | 14 | 9.75 | 17.6 | 25.4 | 1.82 |
| Comparative Example 106 | super | 60 | 0.35 | 199.6 | 24 | 22 | 9.75 | 14.0 | 25.5 | 2.10 |
| Comparative Example 107 | super | 60 | 0.35 | 199.6 | 18 | 14 | 11.25 | 15.8 | 25.1 | 1.86 |
| Comparative Example 108 | super | 60 | 0.35 | 199.6 | 24 | 22 | 11.25 | 12.2 | 25.4 | 2.15 |
| Comparative Example 109 | super | 180 | 0.5 | 125 | 18 | 14 | 7.5 | 19.2 | 27.8 | 1.26 |
| Example 45 | super | 180 | 0.5 | 125 | 24 | 22 | 7.5 | 15.6 | 28.0 | 1.86 |
| Comparative Example 110 | super | 180 | 0.5 | 125 | 18 | 14 | 9.75 | 17.6 | 27.9 | 1.40 |
| Example 46 | super | 180 | 0.5 | 125 | 24 | 22 | 9.75 | 14.0 | 27.9 | 1.92 |
| Comparative Example 111 | super | 180 | 0.5 | 125 | 18 | 14 | 11.25 | 15.8 | 28.2 | 1.45 |
| Example 47 | super | 180 | 0.5 | 125 | 24 | 22 | 11.25 | 12.2 | 28.7 | 1.99 |
| Comparative Example 112 | super | 60 | 1.0 | 38 | 18 | 14 | 7.5 | 19.2 | 27.8 | 1.38 |
| Example 48 | super | 60 | 1.0 | 38 | 24 | 22 | 7.5 | 15.6 | 27.9 | 1.92 |
| Comparative Example 113 | super | 60 | 1.0 | 38 | 18 | 14 | 9.75 | 17.6 | 28.3 | 1.52 |
| Example 49 | super | 60 | 1.0 | 38 | 24 | 22 | 9.75 | 14.0 | 27.9 | 1.96 |
| Comparative Example 114 | super | 60 | 1.0 | 38 | 18 | 14 | 11.25 | 15.8 | 28.0 | 1.56 |
| Example 50 | super | 60 | 1.0 | 38 | 24 | 22 | 11.25 | 12.2 | 28.2 | 2.14 |
| Comparative Example 115 | conventional | 180 | 1.0 | 38 | 24 | 22 | 11.25 | 12.2 | 21.4 | 2.02 |
| Comparative Example 83 | super | 180 | 1.0 | 38 | 8 | 14 | 7.5 | 19.2 | 29.4 | 0.97 |
| Example 23 | super | 180 | 1.0 | 38 | 24 | 22 | 7.5 | 15.6 | 29.1 | 1.89 |
| Comparative Example 87 | super | 180 | 1.0 | 38 | 18 | 14 | 9.75 | 17.6 | 29.3 | 1.45 |
| Example 30 | super | 180 | 1.0 | 38 | 24 | 22 | 9.75 | 14.0 | 29.5 | 1.93 |
| Comparative Example 89 | super | 180 | 1.0 | 38 | 182 | 14 | 11.25 | 15.8 | 29.2 | 1.51 |
| Example 38 | super | 180 | 1.0 | 38 | 24 | 22 | 11.25 | 12.2 | 29.3 | 2.02 |

In the above examples and comparative examples, the changes of strength and adhesion force of the dipped cord were observed by simultaneously changing the temperature and tension in the stretch heating treatment before the dipping and the composition of the dipping solution, from which the following was confirmed.

The higher the temperature or tension in the stretch heating treatment, the higher the strength, but the adhesion force largely differs in accordance with the composition of the dipping solution. In order to ensure the level satisfying the given cord strength and adhesion force to rubber, it is indispensable to satisfy the relations (1) to (3) in case of the super-high strength nylon-6 cord and (4) to (6) in case of the super-high strength nylon-6,6 cord.

Moreover, as seen from Comparative Examples 102 (conventional nylon-6 cord, yarn strength: 21.5 kg/yarn) and 115 (conventional nylon-6,6 cord, yarn strength: 21.5 kg/yarn), the strength and adhesion force of the dipped cord after the stretch heating treatment hardly reduced and were approximately equal to those obtained by the conventional dipping method.

As mentioned above, in the method of treating nylon-6 or nylon-6,6 cords with the adhesive according to the invention, the strength reduction of super-high strength nylon-6 or nylon-6,6 cords having a yarn strength of not less than 12 g/d can be prevented by optimizing the stretch heating treatment before the application or impregnation of the dipping solution and the composition of the dipping solution, and also the adhesion force to rubber durable to use as a tire cord can be given to the cords. Therefore, the invention makes possible to reduce the tire weight and fuel consumption and save the resource.

What is claimed is:

1. A method for treating nylon-6 cord with an adhesive containing the steps of:
   (A) subjecting a twisted cord made from nylon-6 fiber having a yarn strength of not less than 12 g/d to a stretch heating treatment under temperature and tension conditions satisfying the following relationship:

$$T \geq 84/S - 80 \qquad (1)$$

wherein T is a temperature (°C.) in the strength heating treatment of the cord and S is a tension (g/d) in the stretch heating treatment of the cord; and
   (B) subjecting the resulting stretch heat treated cord to an adhesive treatment in a dipping solution satisfying the following relationships:

$$y \geq -0.75x + b \qquad (2)$$
   $$b = -0.274z^2 + 4.282z + 16.8 \qquad (3)$$

wherein x is a solid content (weight %) in the dipping solution, y is a ratio (weight %) of the total weight of resorcin and formaldehyde to weight of latex in the dipping solution and z is a ratio (weight %) of the weight of vinylpyridine latex to the total weight of vinylpyridine latex and styrene-butadiene copolymer latex in the latex of the dipping solution.

2. A method of treating nylon-6,6 cord with an adhesive comprising the steps of:
   (A) subjecting a twisted cord made from nylon-6,6 fiber having a yarn strength of not less than 12 g/d to a stretch heating treatment under temperature and tension conditions satisfying the following relationship:

$$T \geq 87/S - 49 \qquad (4)$$

wherein T is a temperature (°C.) in the stretch heating treatment of the cord and S is a tension (g/d) in the stretch heating treatment of the cord; and
   (B) subjecting the resulting stretch heat treated cord to an adhesive treatment in a dipping solution satisfying the following relationships:

$$y \geq -0.61x + b \qquad (5)$$
   $$b = -0.1319z^2 + 1.566z + 25.87 \qquad (6)$$

wherein X is a solid content (weight %) in the dipping solution, y is a ratio (weight %) of the total weight of resorcin and formaldehyde to weight of latex in the dipping solution and z is a ratio (weight %) of the weight of vinylpyridine latex to the total weight of vinylpyridine latex and styrene-butadiene copolymer latex in the latex of the dipping solution.

3. The method according to claim 1, wherein said temperature in the stretch heating treatment is not higher than 225° C.

4. The method according to claim 3, wherein said temperature in the stretch heating treatment is not higher than 260° C.

5. The method according to claim 1 or 2, wherein said tension in the stretch heating treatment is not more than 1.5 g/d.

6. The method according to claim 1 or 2, wherein said stretch heating treatment is carried out for a time of 10 to 60 seconds.

7. The method according to claim 1 or 2, wherein z in said relationship (3) or (6) is not more than 12% by weight.

8. The method according to claim 1 or 2, wherein x in said relationship (2) or (5) is within a range of 16 to 26% by weight.

* * * * *